United States Patent
Duffy

[15] 3,636,767
[45] Jan. 25, 1972

[54] MEASUREMENT OF FLUID FLOW

[72] Inventor: Laurence Sidney Duffy, Redbourn, St. Albans, England

[73] Assignee: George Kent Limited, Luton, England

[22] Filed: June 10, 1968

[21] Appl. No.: 735,688

[30] Foreign Application Priority Data

June 16, 1967 Great Britain..................27,979/67

[52] U.S. Cl. .......................................................73/229
[51] Int. Cl. .........................................................G01f 1/06
[58] Field of Search ..................338/32; 324/45, 71; 73/174, 73/231, 228; 340/239

[56] References Cited

UNITED STATES PATENTS

| | | | |
|---|---|---|---|
| 3,158,827 | 11/1964 | Beckman | 338/3 |
| 3,386,282 | 6/1968 | Jacobson | 73/88.5 |
| 3,063,295 | 11/1962 | Dowdell | 73/194 |
| 3,131,560 | 5/1964 | Cushman et al. | 73/194 |
| 3,208,269 | 9/1965 | Eccles et al. | 73/231 |
| 3,238,776 | 3/1966 | Potter | 73/231 |
| 3,372,591 | 3/1968 | Clinton et al. | 73/231 |
| 3,385,107 | 5/1968 | Hutcheon et al. | 73/194 |

FOREIGN PATENTS OR APPLICATIONS 915,659 1/1963 Great Britain..........................73/133

OTHER PUBLICATIONS

Aerovox Research Worker Vol. 36, Nos. 1– 12 Jan./Dec. 1966

*Primary Examiner*—Charles A. Ruehl
*Attorney*—Young & Thompson

[57] ABSTRACT

An electric signal is produced which is dependent on fluid flow, by producing a magnetic field which changes with fluid flow and by positioning in the changing magnetic field a semiconductor detector whose electrical characteristics change in accordance with the changes in the field and which produces the electric signal in response to those changes.

7 Claims, 17 Drawing Figures

PATENTED JAN 25 1972
3,636,767
SHEET 1 OF 4
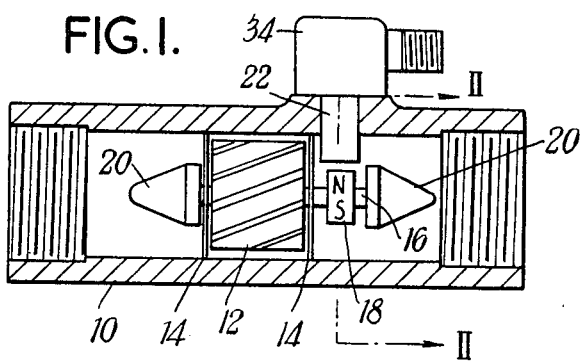
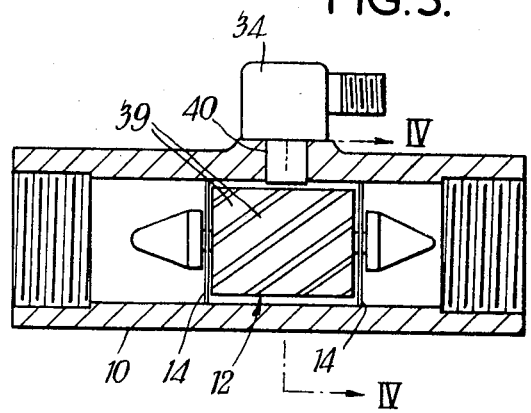
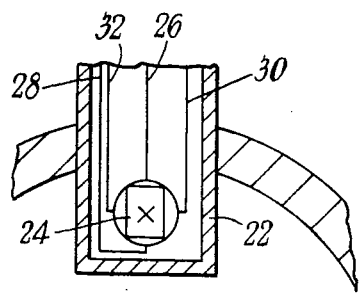
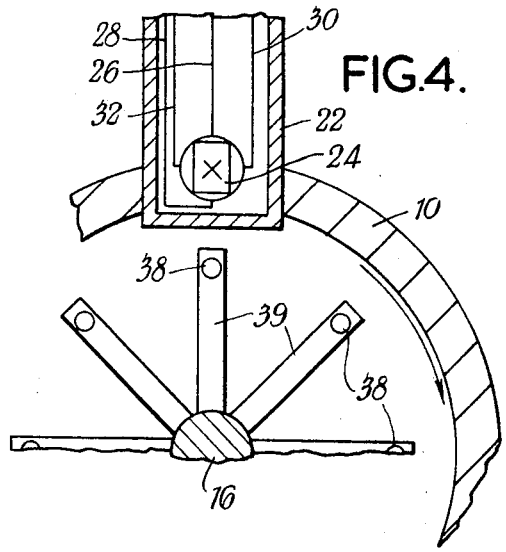
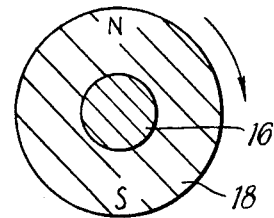
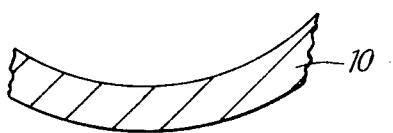
INVENTOR
LAURENCE SIDNEY DUFFY
BY Young & Thompson
ATTYS.

INVENTOR
LAURENCE SIDNEY DUFFY
By Young & Thompson
ATTYS.

INVENTOR

LAURENCE SIDNEY DUFFY

By Young + Thompson

ATTYS.

MEASUREMENT OF FLUID FLOW

The invention relates to the electrical detection of fluid flow.

The object of the invention to provide an improved method and apparatus for obtaining an electric signal dependent on fluid flow.

The invention accordingly provides apparatus for producing an electric signal dependent upon fluid flow, the apparatus comprising means responsive to the fluid flow to cause changes in a magnetic field, and a semiconductive detector means positioned in the magnetic field, the detector means having electrical characteristics which change in accordance with the changes in the field, and being arranged to provide the electric signal in response to such changes.

The invention also provides a method of obtaining an electric signal dependent on fluid flow, the method comprising the steps of causing the fluid flow to effect changes in a magnetic field, and positioning in the changing magnetic field a semiconductive detector means having electrical characteristics which change in accordance with the changes in the field, and being arranged to provide the electric signal in response to such changes.

The changes in the magnetic field can be effected by associating with a turbine or paddle wheel driven by the flow one or more magnets or magnetic members so as to provide a magnetic field which changes because of the flow, preferably in a manner dependent on the speed of the flow. The moving magnets are conveniently permanent magnets so that no electrical connections to them need be made. It is however within the scope of the invention to arrange for the movement of an electromagnet to obtain the changing magnetic field.

The means responsive to the changes in the field can comprise a Hall plate which will provide an output voltage each time the field changes. This output is independent of the rate of change of the field and can be integrated to provide a signal proportional to the number of field changes per unit time. The distance between the plate and the magnet or magnets is not critical and the detector can be placed outside the casing of the turbine. As a discrete change of the magnetic field has to be sensed, a low-grade Hall plate can be used.

Instead of a Hall plate, one or more magnetoresistive elements can be used as the detector means. Such elements are relatively inexpensive and several can be employed, for example around a rotating magnet, to give several output pulses per rotation. Moreover, they do not require an exciting voltage so that a two-wire connection to the detector is sufficient. There is again no need for precise positioning of the detector.

It will be appreciated that by using Hall plate or magnetoresistive elements as detector or pickoff means in association with changing magnetic fields due to moving magnets, negligible resistance to this movement is involved as there is effectively no magnetic reaction between the moving and the fixed parts i.e., the detector means takes a negligible amount of energy from the field and thus has only a negligible retarding effect on the flow responsive means. The parts therefore have no preferred magnetic orientation, that is there is no position in which potential energy due to magnetic forces is at a minimum.

By way of example only, illustrative embodiments of the invention are described below with reference to the accompanying drawings, in which:

FIG. 1 is a part sectional side view of a first embodiment of the invention;

FIG. 2 is a partial, partly schematic, view taken on the section line II—II of FIG. 1, on a larger scale;

FIG. 3 is a view resembling that of FIG. 1 of a second embodiment of the invention;

FIG. 4 is a partial, partly schematic, view taken mainly on the section line IV—IV of FIG. 3, on a larger scale;

Figure 5:
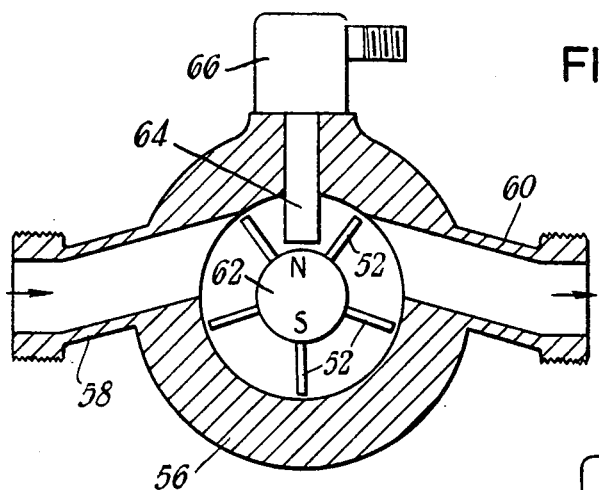
FIG. 5 is a mainly sectional side view of a third embodiment of the invention.

The apparatus of FIG. 1 and 2 comprises a flow tube 10 which can be connected into a pipe line so as to receive a fluid flow. The tube 10 has a turbine member 12 mounted therein for rotation about the axis of the tube by support means 14 on a shaft 16. The shaft 16 rotates with the turbine member 12 to effect rotation of a disc 18 carried on the shaft. As indicated in FIG. 2, the disc is magnetized along a diameter so that it has a north pole and a south pole at diametrically opposed positions. The shaft 16 carries conical flow directing members 20 at each end for reducing turbulence due to the presence of the turbine member.

Projecting through an aperture in the wall of the tube 10 is a tubular detector casing 22, the end of the casing within the tube being closed. As shown schematically in FIG. 2, the casing 22 has a Hall plate 24 mounted therein at a position adjacent the magnetized disc 18. An electric supply for energizing the Hall plate 24 is brought thereto by leads 26 and 28 and the Hall output voltage is taken from the plate by leads 30 and 32. The Hall voltage is treated in a suitable circuit arrangement, for example one of those illustrated in FIGS. 9, 10 and 11. The circuit components may be located remotely if desired but can conveniently be accommodated in a housing 34 from which the detector casing 22 projects, the housing being mounted on the flow tube 10 externally thereof.

It will be evident that a fluid flowing through the tube 10 will cause the turbine member 12 and the disc 18 to rotate together. The Hall plate 24 is positioned within the magnetic field due to the poles of the disc 18 and the field intensity will vary as the disc rotates, so causing a variable voltage to be produced on the Hall plate. The Hall plate output voltage is thus an alternating one, the frequency of which depends on the rotational speed of the turbine member 12 and thus on the rate of flow of the fluid through the tube 10.

The embodiment of FIGS. 3 and 4 is in many respects similar to that of FIGS. 1 and 2 and like parts are indicated by the reference numerals previously used. Again a turbine member 12 is rotatable within a flow tube in response to the flow of fluid therethrough. However, instead of providing a magnetized disc on the turbine shaft for rotation with the turbine, a magnet 38 is mounted at the end of each, or at least a plurality, of the blades 39 of the turbine member 12, as indicated in FIG. 4. The directions of magnetization of the magnets 38 are all in a plane at right angles to the common axis of the turbine member and the flow tube, which plane passes through a detector casing 40. The casing 40 resembles the casing 22 of FIG. 1 in that it accommodates a Hall plate on which the magnetic fields due to the magnets 38 can impinge.

As compared with the embodiment of FIGS. 1 and 2, that of FIGS. 3 and 4 has the advantage that the detector casing 40 does not need to project so far into the flow tube as the casing 22 and therefore offers less disturbance to the symmetry of flow within the tube. Moreover, the number of magnets carried by the turbine blades can be sufficient to provide for each rotation of the shaft 16, any required number of changes in the Hall plate output voltage.

The third embodiment of the invention, illustrated in FIG. 5 comprises a turbine member having turbine blades 52 and mounted for rotation on a shaft (not shown) within a casing 56 having inlet and outlet fittings 58, 60 for guiding a fluid tangentially of the member. As with the embodiment of FIG. 1, the turbine shaft carries a magnetized disc 62 for rotation therewith. The disc is magnetized as indicated in FIG. 5 along a diameter. A tubular detector casing 64 projects through an aperture in the wall of the turbine casing 56 with its closed inner end adjacent to the disc 62.

Within the casing 56, a Hall plate is mounted so as to be subjected to the changing magnetic fields due to rotation of the disc 62 with the turbine member. The detector casing extends from a housing 66 mounted externally of the casing 56 and containing the necessary associated circuit components. It will be evident that the relationship of the magnetic disc and the Hall plate is essentially as illustrated in FIG. 2 and the Hall plate output is essentially the same as that provided by the arrangement of FIGS. 1 and 2.

Figure 6:
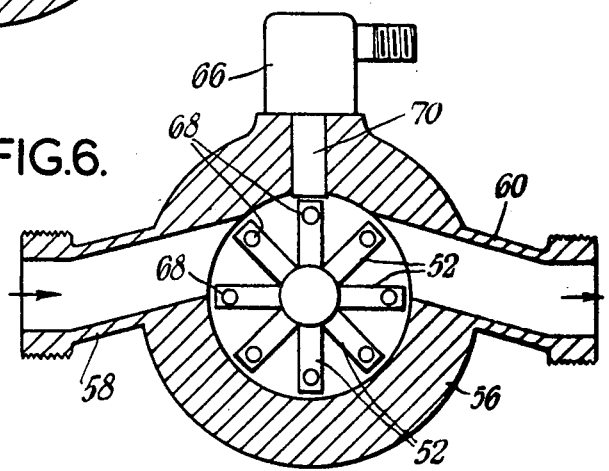
FIG. 6 is a mainly sectional side view of a fourth embodiment of the invention.

The embodiment of FIG. 6 in some respect resembles that of FIG. 5 and like parts have been given the same reference numerals as their equivalents in the earlier figure. Instead however of a diametrically magnetized disc arranged for rotation with the turbine member, the turbine member of FIG. 6 carries a plurality of permanent magnets 68, one magnet being fixed at the end of each of the turbine blades 52. A detector casing 70 again contains a Hall plate responsive to the changing magnetic field due to the passage thereby of the magnets 68 as the turbine member rotates. The arrangement of the magnets and Hall plate is thus similar to that of FIG. 4 and the Hall plate output is of the same general form.

It will be understood that the Hall plate 24 used in the various embodiments of FIGS. 1–8 can be replaced by a magnetic dependent resistor, connected by a pair of leads only to the associated circuit. Moreover, a plurality of such resistors can be spaced with appropriate angular separation, about the axis, each in such a casing such as the casings 22, 40, 64 and 70.

Figure 7:
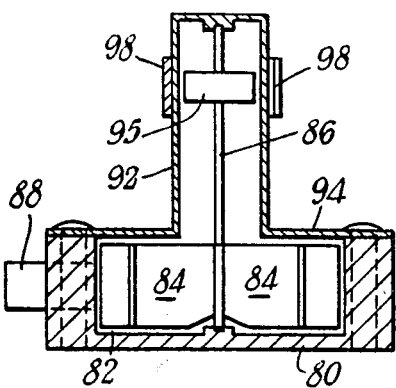
FIG. 7 is a mainly sectional side view of a fifth embodiment of the invention.
Figure 8:
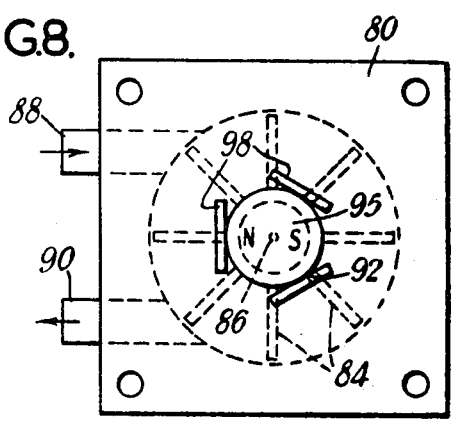
FIG. 8 is a plan view of the embodiment of FIG. 7.

The embodiment of FIGS. 7 and 8 comprises a housing 80 having therein a chamber 82 of circular cross section in plan. A turbine or paddle wheel with blades 84 is mounted for rotation coaxially within the chamber on a shaft 86. The housing 80 has inlet and outlet fittings 88, 90 to the chamber 82 for conducting a fluid tangentially into and out of the chamber to cause rotation of the paddle wheel and the shaft 86. As shown, the shaft 86 extends upwardly from the chamber 82 into an extension 92 thereof formed in a top plate 94 which closes off the top of the chamber 82.

Within this extension 92, the shaft 86 has mounted on it for rotation therewith a disc 95 which resembles the discs 18 and 62 in being magnetized along a diameter.

Around the extension 92 are positioned three magnetoresistive elements 98. The elements are all at the same level and are equally angularly spaced around the axis of the shaft 86. As the magnetized disc 95 rotates with the paddle wheel 84 as consequence of fluid flow into and out of the chamber 82, the magnetic field within which each element stands will change as the poles of the disc pass by them. The resistors 98 are of course connected into an appropriate circuit, for example, as described below with reference to FIG. 17.

The apparatus illustrated and described can be constructed of any suitable material, stationary magnetically permeable material within the magnetic field being avoided or positioned so as to prevent losses and any possibility that the movable parts will have a preferred orientation.

Figure 9:
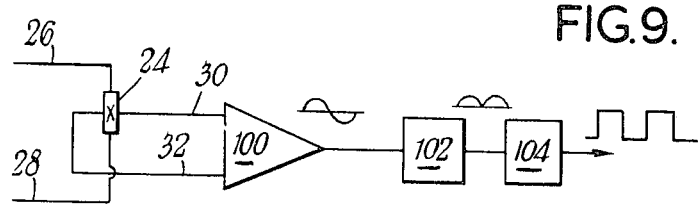
FIG. 9 is a block circuit diagram showing electrical arrangements for use with apparatus employing a Hall plate.
Figure 10:
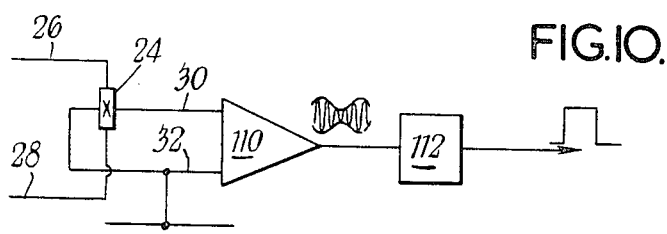
FIG. 10 shows in block form a circuit arrangement alternative to that of FIG. 9.
Figure 11:
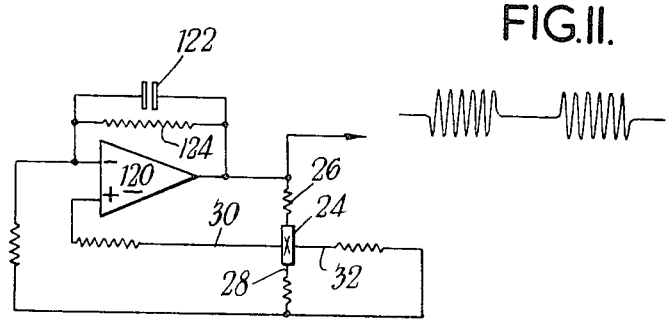
FIG. 11 shows in block form a further circuit arrangement alternative to that of FIG. 9.

Turning now to circuit arrangements for use in apparatus embodying the invention, those of FIGS. 9, 10 and 11 are each applicable for example to any one of the embodiments of FIGS. 1–6 when the detector comprises a Hall plate.

In the circuit of FIG. 9, the leads 26,28 apply a DC energizing voltage to the Hall plate 24 and the leads 30 and 32 carry the Hall plate output to a differential amplifier 100. As mentioned previously, the Hall plate output is effectively a sinusoidal voltage, each cycle of which will represent one complete rotation of the magnetic disc 18 and of the turbine member 12, where the circuit is used in connection with the apparatus of FIGS. 1 and 2. The differentially amplified signal is applied to a full wave rectifier circuit 102 and the fully rectified output is applied to a pulse shaping circuit 104. It will be evident that the pulse shaper 104 provides an output for example a square wave output in which two pulses represent each rotation of the turbine member. The output can conveniently be fed to a counter to provide a measure of the speed of flow of the fluid causing the rotation.

As will be evident the circuit of FIG. 9 could be modified by omission of the full wave rectifier 104, the pulse shaping circuit 104 then being arranged to provide a single pulse only for each cycle of the differential amplifier output. The pulse shaper output then provides only one pulse per rotation of the magnetized disc 18.

Instead of the DC energizing voltage, an AC energizing current can be applied to the Hall plate, on the lines 26, 28. The Hall plate output voltage can then be amplified as shown in FIG. 10 in an amplifier 110 to provide an amplitude modulated AC output. The modulated wave has the frequency of the AC energizing source and the amplitude modulations have the frequency of the rotation of the magnetized disc. As shown in FIG. 10, the amplitude modulated output can be fed to a demodulator and pulse shaping circuit 112 to provide a square wave at a frequency of the rotation of the magnetic disc 18.

The circuit arrangement of FIG. 11 includes an amplifier 120 having a tuned circuit constituted by a network containing a capacitor 122 and a resistor 124. The Hall plate 24 is arranged in a feedback path for the amplifier 120 as shown, the arrangement being such that the amplifier produces an output at a frequency determined by the tuned circuit only when the Hall plate provides a positive-going output voltage. The output provided on line 126 is therefore a series of bursts at the tuned circuit frequency, each burst representing one complete rotation of the magnetized disc, where the circuit is employed in connection with apparatus as shown in FIGS. 1 and 2 or FIG. 5, or the passage of a magnet, where the apparatus is as shown in FIGS. 3 and 4 or FIG. 5.

Figure 12:
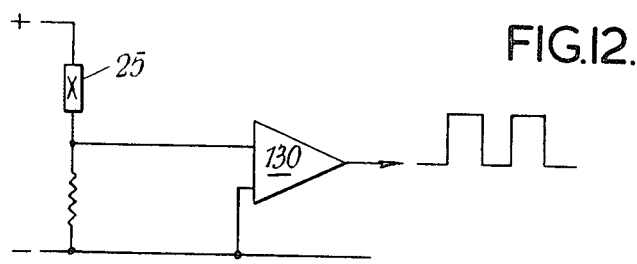
FIG. 12 shows in block form a circuit arrangement for use with apparatus employing a magnetic dependent resistor.
Figure 13:
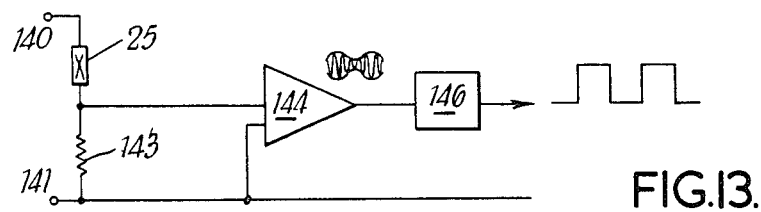
FIG. 13 shows in block form a circuit arrangement alternative to that of FIG. 12.

The circuits shown in FIGS. 12 and 13 are for use with apparatus in accordance with the invention, for example as shown in FIGS. 1–6, in which the detector means comprises a magnetoresistive element, for example, a resistor of indium antimonide semiconductor, the resistivity of which changes when a magnetic field is created across it, independently of the field direction.

The simple circuit of FIG. 12 is DC energized. As applied for example to the apparatus of FIG. 6, the circuit employs the changes in the current flowing through a fixed value resistor 131 in series with the magnetoresistive resistor element 25 and the DC supply, due to the changing magnetic field resulting from the passage thereby of the magnets 68, to operate a trigger circuit 130 to provide a pulse for each such change.

As applied to the apparatus of FIG. 5, the resistor 25 undergoes two changes for each rotation of the magnetized disc 62, due to the approach and withdrawal of each of the poles. The trigger output then consists of pulses at twice the frequency with which the magnetized disc and the turbine driving it are rotated.

FIG. 13 shows a circuit energized by AC applied at terminals for 140, 141 across the magnetic responsive resistor 25 and a resistor 143. The effect of resistive changes in the resistor 25 due for example to magnetic field changes caused by rotation of the disc 62 in the apparatus of FIG. 5 is to amplitude modulate the energizing frequency at a frequency twice that at which the disc rotates. The variable signal developed across the resistor is applied to an amplifier 144 the output of which is applied to a demodulator and pulse forming circuit 146 to provide, for example, square wave pulses for counting.

Figure 14:
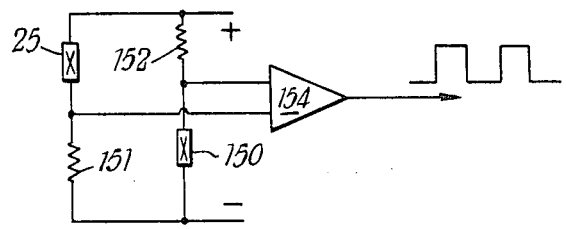
FIG. 14 shows in block form a circuit arrangement for use with apparatus employing two magnetic dependent resistors.

The circuit arrangement of FIG. 14 is suited for use with a diametrically opposed pair of magnetoresistive resistor elements for example in an apparatus as shown in FIGS. 1 and 2 modified by use of a magnetoresistive resistor element 25 in place of the Hall plate 24 and the addition of a resistor element 150 in a detector casing angularly spaced from that illustrated by 180°. The circuit is DC energized and the two resistors 25, 150 are positioned in a bridge network with two resistors 151 and 152. The bridge output is applied to a trigger circuit 154 the output of which will be pulses for example of square shape and of a frequency equal to twice the frequency of rotation of the disc 18. It will be evident that the arrangement of FIG. 14 provides greater sensitivity than those of FIGS. 12 and 13 but the same number of pulses per rotation.

Figure 15:
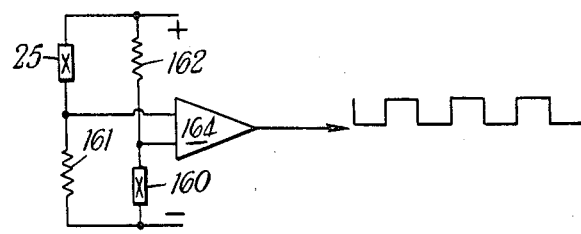
FIG. 15 shows a circuit arrangement in block form alternative to that of FIG. 14.

In FIG. 15, a circuit arrangement is shown for use with two magnetoresistive elements for example in an apparatus as shown in FIGS. 1 and 2 modified by use of a magnetoresistive resistor element 25 in place of the Hall plate 24 and the addition of a second resistor element 160 in a detector casing located at an angular displacement of 90° from that illustrated. The resistors 25, 160 are again connected with fixed value resistors 161, 162 in a DC bridge circuit of which the output is supplied to a trigger circuit 164. Each of the resistors 25, 160 contributes its own effect to the output independently of the other and four pulses per rotation of the disc 18 are obtained at the trigger output as a consequence.

Figure 16:
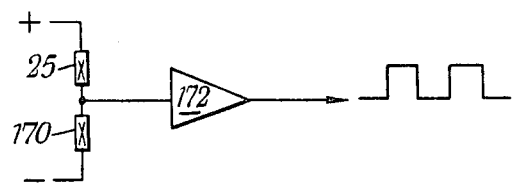
FIG. 16 shows a temperature compensated circuit arrangement for use with apparatus employing a magnetoresistive element.

The circuit arrangement of FIG. 16 is again a DC energized circuit. Only a single magnetoresistive resistor element 25 is positioned in a variable magnetic field, for example, in the apparatus of FIG. 6. A like resistor element 170 is connected in series with the resistor element 25 across the DC supply source, the resistor element 170 being located so as to be exposed to the same temperature conditions as the resistor element 25. The voltage potential between the resistors is applied to a trigger circuit 172 which provides an output in the form of pulses at a frequency corresponding to the frequency of rotation of turbine member multiplied by the number of the magnets 68. The second resistor element 170 functions as a temperature compensator to allow operation of the apparatus over a substantial temperature range.

Figure 17:
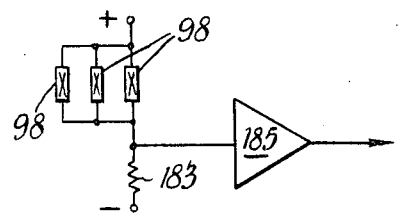
FIG. 17 shows in block form a circuit arrangement for use with apparatus employing more than two magnetoresistive elements.

The circuit arrangement of FIG. 17 includes the three magnetoresistive elements 98 of the apparatus of FIGS. 7 and 8, or can be used with an apparatus as shown in FIGS. 1-6 modified by the use of a magnetoresistive element in place of the Hall plate 24 and the addition of two further magnetoresistive elements in detector casings equally angularly spaced from the casing illustrated. As shown, the resistor elements 98 are connected in parallel in a network in series with a fixed value resistor 183 and a DC source. The voltage between the network and the resistor 183 is supplied to an amplifier and trigger circuit 185 arranged to provide a series of suitably shaped pulses, for example, square waves. If the frequency of rotation of the magnetic disc 95 is $f$ cycles per second, the pulse repetition rate will be $6f$ per second. If turbine blades carrying $n$ magnets 38 or 68 replace the disc 95, the pulse repetition rate will be $3nf$. Where a still larger number of pulses per revolution of the turbine member are required a larger number of magnetoresistive resistor elements can be provided at suitable positions around the rotational axis of the disc and connected in parallel with the resistor elements 98.

It will be appreciated that the invention is not limited to any particular number or arrangement either of magnets for causing the changing magnetic field or of detector means responsive to the changes. The invention thus provides for the convenient and effective detection or measurement of fluid flow. The scope of the invention is not limited by the foregoing description but is as defined by the following claims.

I claim:

1. Apparatus for sensing the rate of fluid flow through a conduit, comprising flow responsive means rotatably mounted within the conduit for transforming fluid motion into rotational motion;

magnetic means mounted on said flow responsive means for producing a time varying magnetic field proportional to the rate of flow of the fluid;

input potential means for providing a source of electrical energy;

output signal circuit means for indicating the rate of flow of the fluid; and field responsive means mounted adjacent said flow responsive means for providing electrical energy in the form of an output signal responsive to the time varying magnetic field by modulating the electrical energy from said input potential means, said field responsive means including at least one magnetoresistive element of semiconductor material, each said magnetoresistive element having a single input lead connected to said input potential means and a single output lead connected to said output signal circuit means to cause substantially all the energy supplied to said output signal circuit means by said field responsive means to be derived from said input potential means.

2. Apparatus as claimed in claim 1 wherein said input potential means is a DC power source and said output signal circuit means includes a resistor connected in series with said field responsive means across said DC power source, said DC power source being connected to the input connection of each such magnetoresistive element and said resistor being connected to the output connection of each such magnetoresistive element, and trigger circuit means connected to provide a pulse output in response to resistance changes in said magnetoresistive element.

3. Apparatus as claimed in claim 2 wherein said resistor is a second magnetoresistive element positioned outside said magnetic field so as to be exposed to the same temperature conditions as the magnetoresistive element of said field responsive means.

4. Apparatus as claimed in claim 1 wherein said field responsive means includes a resistive bridge circuit including a pair of magnetoresistive elements connected in opposed arms of said bridge circuit and positioned to respond successively to changes in said magnetic field, said output signal circuit means including trigger circuit means connected to receive an output signal from said bridge circuit, said trigger circuit means operating to provide a pulse output in response to said bridge circuit output signal.

5. Apparatus as claimed in claim 1 wherein said input potential means is an AC power source and said output signal circuit means includes a resistor connected in series with said field responsive means across said AC power source, an amplifier connected across said resistor, and a demodulating and pulse shaping circuit means connected to receive an output signal from said amplifier.

6. Apparatus as claimed in claim 1 wherein said flow responsive means includes a tangential flow turbine member mounted for rotation in a turbine casing through which fluid flows, said turbine member being mounted for rotation about an axis at right angles to the direction of fluid flow by an axially extending turbine shaft rotatable therewith, said magnetic means includes a disc connected to said turbine shaft for rotation therewith remote from said turbine member, said disc being magnetized in a direction transverse to the axis of rotation thereof, said field responsive means includes a plurality of magnetoresistive elements positioned externally of said turbine casing.

7. Apparatus as claimed in claim 1 wherein said flow responsive means includes a rotatable turbine mounted coaxially in a tubular turbine casing through which fluid flows, said magnetic means including a magnetic unit mounted for rotation with said turbine and magnetized in a direction transverse to the angle of rotation thereof, said magnetic unit being mounted for rotation in such a manner as to have no preferred orientation.

* * * * *